April 10, 1928.  1,665,940
J. A. SWEENEY
SPECTACLE TEMPLE
Filed March 18, 1927
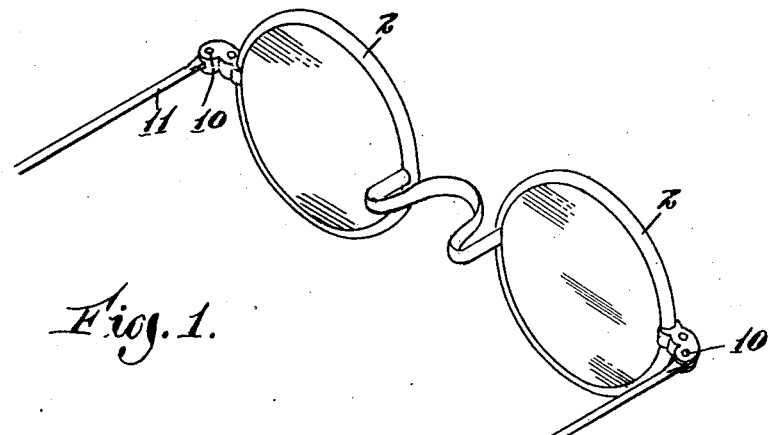
Fig. 1.
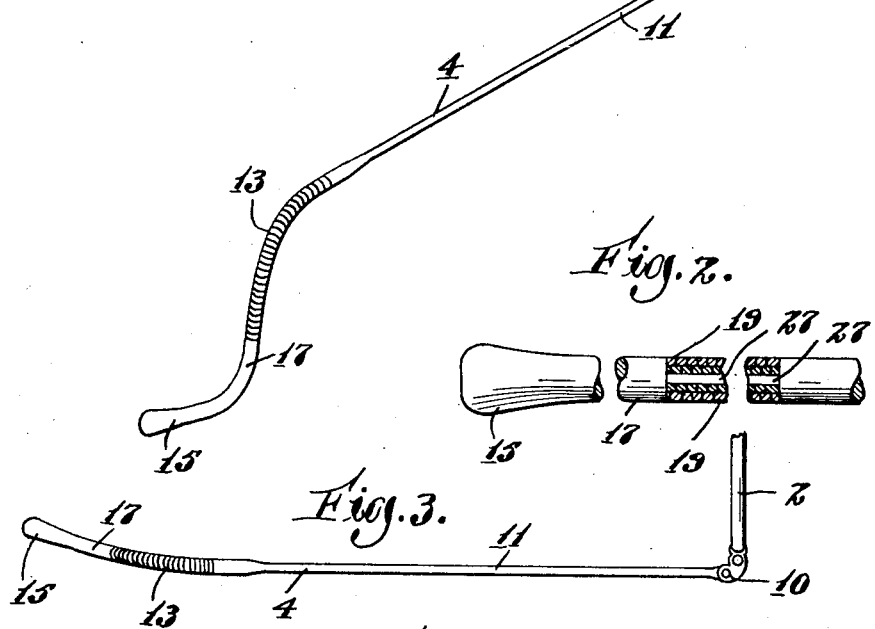
Fig. 2.
Fig. 3.
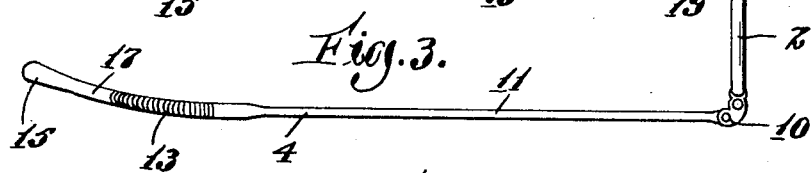
Fig. 4.
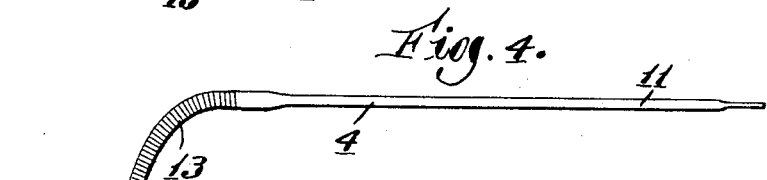
Inventor
James A. Sweeney
by David Rines
Attorney Patented Apr. 10, 1928.

1,665,940

UNITED STATES PATENT OFFICE.

JAMES A. SWEENEY, OF ROCHESTER, NEW YORK, ASSIGNOR TO BAUSCH & LOMB OPTICAL COMPANY, OF ROCHESTER, NEW YORK, A CORPORATION OF NEW YORK.

SPECTACLE TEMPLE.

Application filed March 18, 1927. Serial No. 176,507.

The present invention relates to ophthalmic mountings, and more particularly to spectacle temples.

Skull temples are provided with rear portions that are intended to grip the skull behind the ears. If they grip firmly, their binding action is, at times, most uncomfortable; and if they grip weakly, the spectacles are held loosely and tend to fall off the wearer's face.

The chief object of the present invention, therefore, is to improve upon skull temples, to the end that they shall hold the spectacles firmly in place, but without causing annoyance to the wearer. Other and further objects will be explained hereinafter, and will be particularly pointed out in the appended claims.

In the accompanying drawings, Fig. 1 is a perspective view of an ophthalmic mounting containing a temple constructed according to a preferred embodiment of the present invention; Fig. 2 is a broken fragment of the temple illustrated in Fig. 1, partly in section; Fig. 3 is a plan of the temple shown in Fig. 1, shown pivoted to a portion of a lens-holding frame; and Fig. 4 is an elevation of the preferred temple.

The invention is shown for illustrative purposes in connection with a spectacle mounting comprising a lens-holding frame or front 2 and temples 4, the forward portions 11 of which are pivotally connected to the lens-holding frame by a pivot pin or pintle 10.

The forward portions 11 of skull temples are substantially straight. The intermediately disposed portions 13 are bent downwardly and laterally towards each other. The rear tip portions 15 are bent laterally towards each other to engage opposite sides of a wearer's skull. As above explained, either the portions 15 bind uncomfortably, or the spectacles are held too loosely.

According to the present invention, the rear ends of the straight portions 11 and the forward parts of the intermediately disposed portions 13 are made comparatively laterally resilient. As the remainder of the comparatively inflexible forward portions 11 maintain their stiffness, the whole yield caused by the reaction of the skull to the pressure of the rear portions 15 is taken up by the comparatively flexible portions. The rear tip portions 15 thus bind lightly but inflexibly against the skull, with just the right amount of resilient tension to hold the spectacles firmly in place. Particular note should be made of the fact that the inflexible rear tip portions 15 and the inflexible rear parts 17 of the intermediate portions 13 are together of substantial length, so as to provide a sufficiently large, inflexible, skull-engaging area to engage the skull inflexibly, but resiliently, as a unit.

The desired result may, of course, be brought about in many ways without departing from the spirit or scope of the present invention. According to the preferred construction, the comparatively flexible portion of the temple may comprise one or more flexible metal strands 19, wound helically about a thin, resilient, metal core 27. The core 27 and the strands 19 are soldered or otherwise connected at their ends with the portions of the temple to the rear and to the front thereof. As these latter portions are of comparatively inflexible or stiff, solid metal, the yielding action takes place at the flexible portion only, comprising the core 27 and the strands 19 that are laterally flexibly resilient as a unit.

The temple is bent into skull-temple shape, as illustrated. Once adjusted to the desired shape, the temple will hold the spectacles in place without discomfort. Different lateral adjustments, of course, are required for different wearers, and these adjustments may be made without bending the stiff portions 11 and 15 of the temple.

Modifications will readily suggest themselves to persons skilled in the art, and all such are considered to fall within the present invention, as defined in the appended claims.

What is claimed is:

1. A spectacle skull temple having a substantially straight forward portion, a bent intermediate portion and a rear tip portion bent laterally to engage the wearer's skull, the forward part of the forward portion, the rear part of the intermediate portion and the rear tip portion being comparatively inflexible, and the rear end of the forward portion and the forward part of the intermediate portion being comparatively resilient, whereby the rear tip portion will engage the skull resiliently but inflexibly with a resilient binding action.

2. A spectacle skull temple having a substantially straight comparatively inflexible forward portion, a bent intermediate portion, and a rear tip portion bent laterally to engage the wearer's skull, the rear part of the intermediate portion and the rear tip portion being comparatively inflexible, and the forward part of the intermediate portion being comparatively resilient, whereby the rear tip portion will engage the skull resiliently but inflexibly with a resilient binding action.

3. A spectacle skull temple having a substantially straight forward portion, an intermediate portion bent downwardly and laterally, and a rear tip portion bent laterally to engage the wearer's skull, the forward part of the forward portion, the rear part of the intermediate portion and the rear tip portion being comparatively inflexible, and the rear end of the forward portion and the forward part of the intermediate portion being comparatively resilient, whereby the rear tip portion will engage the skull resiliently but inflexibly with a resilient binding action.

4. A spectacle skull temple having a substantially straight forward portion, an intermediate portion, and a comparatively inflexible rear tip portion bent laterally to engage the wearer's skull, the forward part of the forward portion, the rear part of the intermediate portion, and the rear tip portion being comparatively inflexible, and the rear end of the forward portion and the forward part of the intermediate portion comprising a laterally resilient helical member, whereby the rear tip portion will engage the skull resiliently but inflexibly with a resilient binding action.

5. A spectacle skull temple having a substantially straight forward portion, an intermediate portion bent downwardly and laterally, and a rear tip portion bent downwardly and laterally to engage the wearer's skull, the forward part of the forward portion, the rear part of the intermediate portion and the rear tip portion being comparatively inflexible, and the rear end of the forward portion and the forward part of the intermediate portion comprising a resilient core and a helical flexible member covering the core and both integrally connected at their ends with the rear end of the forward portion and the forward part of the rear tip portion, and the core and the helical member together being laterally flexibly resilient, whereby the rear tip portion will engage the skull resiliently but inflexibly with a resilient binding action.

6. A spectacle skull temple having a substantially straight comparatively inflexible forward portion, a bent intermediate portion, and a rear tip portion bent laterally to engage the wearer's skull, the rear part of the intermediate portion and the rear tip portion being comparatively inflexible, and the forward part of the intermediate portion comprising a resilient core and a helical flexible member covering the core and both integrally connected at their ends with the forward portion and the forward part of the tip portion, and the core and the helical member together being laterally flexibly resilient, whereby the rear tip portion will engage the skull resiliently but inflexibly with a resilient binding action.

In testimony whereof, I have hereunto subscribed my name.

JAMES A. SWEENEY.